Figure 1:
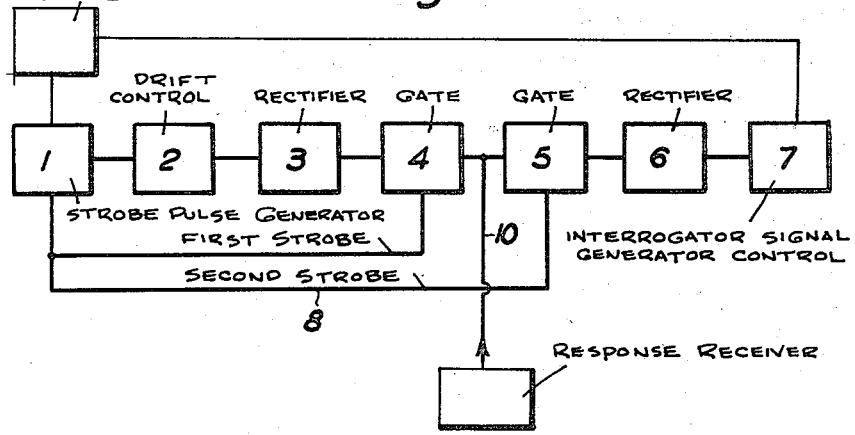

Jan. 19, 1960　　　T. A. McMULLIN　　　2,922,155
RADAR SYSTEMS
Filed Dec. 22, 1952

INVENTOR
Terence Alexander McMullin.
BY
ATTORNEY

2,922,155

RADAR SYSTEMS

Terence Alexander McMullin, Welwyn Garden City, England

Application December 22, 1952, Serial No. 327,294

Claims priority, application Great Britain December 24, 1951

3 Claims. (Cl. 343—6.5)

This invention relates to interrogator-respondor radar beacon systems using ground beacons and air-borne radar, and its purpose is to increase the number of aircraft a beacon can serve.

Interrogation pulses are radiated from an aircraft at a pre-determined repetition rate. The beacon response occupies a certain short time and a further interval elapses before the beacon is ready to respond to another interrogation pulse. These factors determine the maximum number of aircraft to which the beacon could respond even if the independent interrogating pulses were evenly spaced. In fact their spacing will be random; moreover the interrogating pulses from any one aircraft are preferably not evenly spaced, but the intervals between them are randomly distributed about a mean value. So long before the number of aircraft reaches the maximum for evenly spaced interrogations the beacon will fail to respond to a certain proportion of interrogations.

A consequence of this is that in any aircraft working with a busy beacon the mean rate at which responses are received will be somewhat less than the mean rate of interrogation.

In an interrogating aircraft search is made for a beacon response by the aid of a drifting strobe pulse (or sometimes a double strobe pulse), and upon the strobe pulse coming into coincidence with the response pulse (or, if double, straddling the response pulse), its normal drift is eliminated and the strobe pulse is locked to the response pulse. The rate of strobe drift is necessarily high compared with the rate of change of range of the aircraft from the beacon, and so considerable negative acceleration of the strobe pulse is necessary to lock it to the response pulse. This involves the expenditure of a substantial amount of energy, mainly in varying the charge of condensers.

For this reason, and particularly where the range ascertained by the interrogator-respondor system is to be shown upon a dial, for instance of a voltmeter, a certain minimum mean rate of reception of response pulses is necessary to bring about locking of the strobe pulse, and if the beacon is too busy to respond to a sufficient proportion of interrogations to maintain this rate, locking of the strobe pulse will not occur.

But once the strobe pulse is locked to the response pulse, the shifts it must suffer to keep in coincidence with the response pulse correspond with the rate of change of range, which cannot exceed the speed of the aircraft. So the strobe pulse will be kept locked to the response pulse even though the rate of reception of response pulses falls far below that necessary to bring about locking.

The present invention makes use of this fact to reduce the demand made by an aircraft upon the time of a beacon once its receiver has locked itself to the beacon signal. The beacon is therefore able to deal with a far greater number of aircraft before its failures to respond to reach such a proportion that yet another aircraft will be unable to lock itself to the beacon signal, or reach such a proportion that its sensitivity must be reduced to exclude the fainter signals of a certain number of aircraft.

The method by which the invention reduces the demand made by an aircraft upon a beacon is automatically to reduce the mean repetition frequency of the interrogator pulses upon the strobe pulses locking on to the response of the beacon and thereafter to vary the interrogator frequency in dependence upon the mean frequency of the received responses.

If the interrogator-receiver is to remain locked to the beacon the mean frequency of the received responses must not fall below a minimum value determined by the strobe control circuit. So the interrogator frequency must be increased as the proportion of received responses to interrogations diminishes. It follows that in all except the worst conditions of beacon overload the interrogator frequency can be less than is necessary under the worst conditions, and therefore a greater number of aircraft can be served by the beacon than would be possible if the interrogator-receiver were always adjusted for the worst conditions.

For the purpose of the invention the interrogation pulse generator needs to be made variable in repetition frequency. Besides the strobe pulse generator, the response receiver and the gating circuit by which the strobe pulse is controlled in well known manner, the invention calls for means for generating a second strobe pulse, for a second gating circuit in which current flows while the second strobe pulse and the received response coincide, and for a generator control circuit in which current so flowing is used to vary the repetition frequency of the interrogator pulse generator.

An independent second strobe pulse generator is not essential; by simple modification the same generator may be made to produce a wide strobe pulse, which drifts and is controlled with the narrow strobe pulse whose overlap with the response pulse locks the strobe to a signal and controls it; and this wide strobe pulse is used to gate the whole of the response pulse (but only the response pulse to which the strobe is locked, with an inevitable proportion of noise and other responses), to a rectifier the integrated output of which is used to control the frequency of the master oscillator governing the transmission of interrogation pulses.

The repetition frequency of the master oscillator will be a maximum during searching, and the automatic control will need always to reduce it upon the interrogator-receiver locking on to a beacon. But the effect of the control must be reduced to zero before the mean frequency of received response pulses falls to the limit at which the strobe pulse can no longer be held locked. This may be ensured by applying suitable limits to the control circuits preventing the mean frequency of interrogation pulses being reduced below a predetermined value; or by making the time constant of the rectifier circuit controlling the frequency less than that of the rectifier circuit which locks the strobe, or in other ways.

The invention will be further described with reference to the apparatus illustrated in the accompanying drawings.

Figure 2:
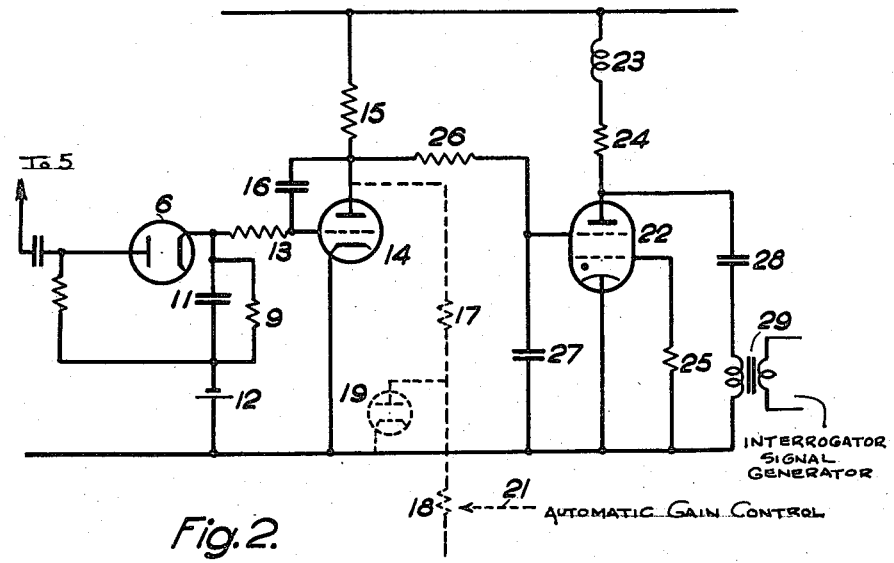

Figure 1 is a block diagram of the complete apparatus;
Figure 2 shows in full those elements with which the invention is chiefly concerned.

The strobe generator is indicated by 1. Various forms of strobe generator are well known; in some a double strobe is generated, that is to say for each emitted interrogator pulse two strobe pulses are produced spaced apart by a delay circuit so that there is a short interval of time between them; in others single strobe pulses of short duration are produced. In either case the strobe pulse is caused to drift relatively to the interrogator pulse. The rate of drift is governed by a drift control circuit indicated at 2. As a result of drift the strobe pulse may come into coincidence with the response received from the beacon or in the case of a double strobe may straddle the response. Both the strobe pulse and the response 10 are applied to a gating circuit 4 which passes current only when the two coincide, or overlap, in time. The current then passing is rectified by the rectifier 3 and applied to the drift control circuit 2 to arrest the drift and thereafter so to control the drift that the strobe pulse continues to overlap the received response, or in the case of a double strobe continues to straddle the received response.

Various circuits operating in this fashion are known and it is unnecessary to describe them in greater detail.

For the purpose of the invention a second strobe pulse is generated, which can be of a duration equal to that of the received response. As indicated in Figure 1 it may be produced by the same strobe generator 1. It is applied through the lead 8 to a second gating circuit 5 to which also the received response is supplied. The timing of the second strobe pulse in relation to the interrogator pulse is determined by the drift control circuit. But whereas the effect of the drift control is to cause the first strobe to overlap the received response only so much as is necessary to correct the drift, the second strobe can be a pulse of sufficient duration to cover the whole period of a response. Hence, when once the interrogator-receiver has locked on to a beacon, gating circuit 5 will pass the whole of the response of that beacon, and necessarily will also pass any noise or any foreign response which happens to be received at the same time; but noise and foreign responses will ordinarily, and must for satisfactory operation, be insignificant beside the response pulses of the beacon to which the interrogator receiver is locked. These responses will be passed to the rectifier 6 the output of which is supplied to a strobe generator control circuit 7 by which the repetition frequency of the interrogator pulse generator is governed.

A particular frequency control circuit is illustrated in Figure 2. On account of the widely varying range over which the interrogator-receiver works and the consequent wide variation in received signal amplitude, it is usual to equip the interrogator receiver with automatic gain control. The circuit of Figure 2 has the advantage of utilising tubes which are necessarily present for automatic gain control to perform the further function of controlling the repetition frequency of the interrogator pulse generator.

For the purpose of automatic gain control the output of the gating circuit 5 is supplied to the rectifier 6 which has a load resistance 9 shunted by a condenser 11. A source of bias 12 brings the diode 6 to the point of conduction. The output of the diode is fed through resistance 13 to the grid of an amplifier tube 14 having resistance 15 in its anode circuit, and a capacitance 16 connecting its anode and grid. The resistance 13, and capacitances 11 and 16 smooth to some extent the output of the diode 6, and apply to the grid of tube 14 a positive bias dependent on the amplitude (and, as explained below, the frequency) of the received responses. The potential of the anode of tube 14 therefore falls. The anode is connected to a negative potential through resistances 17, 18, shown dotted as not forming part of the invention, resistance 18 and the source of negative potential being bridged by the diode 19. A tapping 21 on the resistance 18 supplies gain correcting bias to the response receiver which is not shown. The automatic gain control does not become operative until the anode potential of 14 has fallen so far that diode 19 no longer conducts.

The repetition frequency of the interrogator pulse generator is governed by a gas-filled tube 22 having inductance 23 and resistance 24 in its anode circuit and its control grid connected to cathode through resistance 25. Through resistance 26 its outer grid is connected to the anode of tube 14, and through capacitance 27 it is connected to earth. The anode of gas-filled tube 22 also supplies through capacitance 28 the primary winding of an output transformer 29.

As is well known the frequency at which the tube 22 becomes conductive varies, other factors being constant, with the voltage applied to its screen grid, which is the voltage of the anode of tube 14.

When response signals are very weak the voltage of the anode of tube 14 will always be high, and the frequency of the gas-filled oscillator 22 will remain high, as is desirable. But unless the signals are very weak the voltage of the anode of 14 and therefore the frequency of 22 will drop considerably upon the interrogator-receiver locking on to a beacon. How much the frequency will drop will depend on the mean frequency of the received responses. The reduction of the frequency of the oscillator 22, that is of the repetition frequency of the interrogator pulses, will correspondingly reduce the frequency of the received responses. The values of the components should be so chosen that when the beacon is not very busy and nearly all interrogator pulses call forth a response, the interrogator frequency is so far reduced that the received responses exceed only by a safety margin the minimum necessary to keep the interrogator-receiver locked to the beacon. If, through the beacon becoming busy or for other reasons, the frequency of the received responses falls further, it is plainly necessary to increase the interrogator repetition frequency. It is important, therefore, to adjust the time constant of the output circuit of diode 6 so that the output falls with decreasing frequency when the response frequency is near the lower safe limit. By suitable design, the mean frequency of the response pulses may be kept near to a safe margin above the minimum necessary to keep the strobe pulse locked, which means that the interrogator pulses will be as infrequent as conditions allow.

I claim:

1. In a radar-beacon system of range determination using fixed ground beacons and aircraft radar, the combination in the airborne interrogator-receiver of an interrogator signal generator of variable frequency, a strobe pulse generator producing a strobe pulse for each interrogator signal, a response receiver, a strobe control circuit connected with the strobe pulse generator and the response receiver and operating to lock the strobe pulse to the received response, with a circuit for generating a second strobe substantially coincident with the first, a gating circuit connected with the second strobe generating circuit and with the response receiver to pass current while the second strobe pulse and the received response coincide, and a signal generator control circuit actuated by current so passed and operating to vary the frequency of the signal generator in dependence upon the mean frequency of the received responses.

2. In a radar-beacon system of range determination using fixed ground beacons and airborne radar, the combination in an airborne interrogator-receiver comprising a pulse generator of variable repetition frequency and a receiver, of means for selecting and gating received signals of the same repetition frequency as the pulse generator and means receiving and operable by gated signals for varying the repetition frequency of said pulse generator.

3. An interrogator-respondor for an aircraft comprising a pulse generator of variable repetition frequency, a receiver, gating means connected with said pulse generator and with said receiver and adjustable to gate signals of the repetition frequency of the pulse generator, and further means connected to receive gated signals and operable by them to vary the repetition frequency of said pulse generator.

References Cited in the file of this patent

UNITED STATES PATENTS

| | | |
|---|---|---|
| 2,459,811 | Grieg | Jan. 25, 1949 |
| 2,517,540 | Busignies | Aug. 8, 1950 |
| 2,530,096 | Sudman | Nov. 14, 1950 |
| 2,753,553 | Dodington | July 3, 1956 |

UNITED STATES PATENT OFFICE

CERTIFICATE OF CORRECTION

Patent No. 2,922,155                                                    January 19, 1960

Terence Alexander McMullin

It is hereby certified that error appears in the above numbered patent requiring correction and that the said Letters Patent should read as corrected below.

In the grant, lines 1, 2 and 3, for "Terence Alexander McMullin, of Welwyn Garden City, England," read -- Terence Alexander McMullin, of Welwyn Garden City, England, assignor to Murphy Radio Limited, of London, England, a British Company, --; line 12, for Terence Alexander McMullin, his heirs" read -- Murphy Radio Limited, its successors --; in the heading to the printed specification, lines 3 and 4, for "Terence Alexander McMullin, Welwyn Garden City, England" read -- Terence Alexander McMullin, Welwyn Garden City, England, assignor to Murphy Radio Limited, London, England, a British Company --.

Signed and sealed this 28th day of June 1960.

(SEAL)
Attest:

KARL H. AXLINE
Attesting Officer

ROBERT C. WATSON
Commissioner of Patents